July 2, 1940.   E. C. HORTON   2,206,814
WINDSHIELD CLEARING SYSTEM
Filed Aug. 12, 1935   2 Sheets-Sheet 2
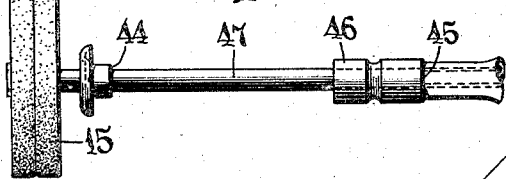
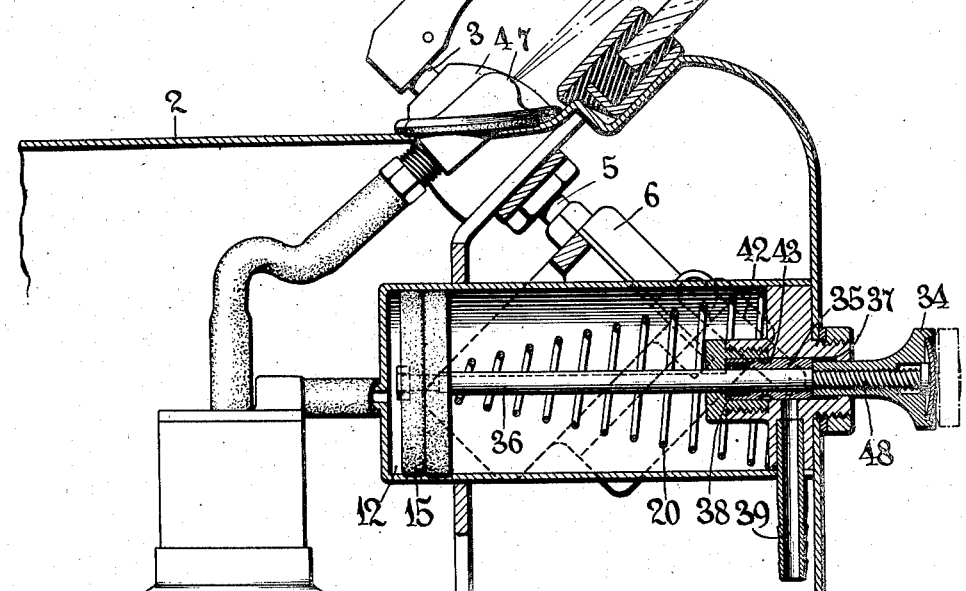
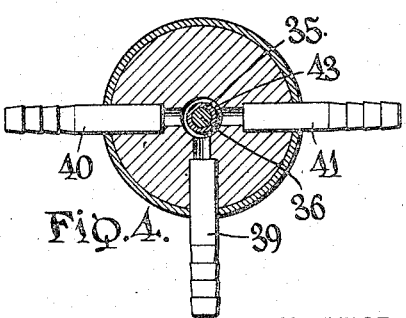
INVENTOR
Erwin C. Horton,
BY
Beau, Brooks, Buckley & Beau.
ATTORNEYS Patented July 2, 1940

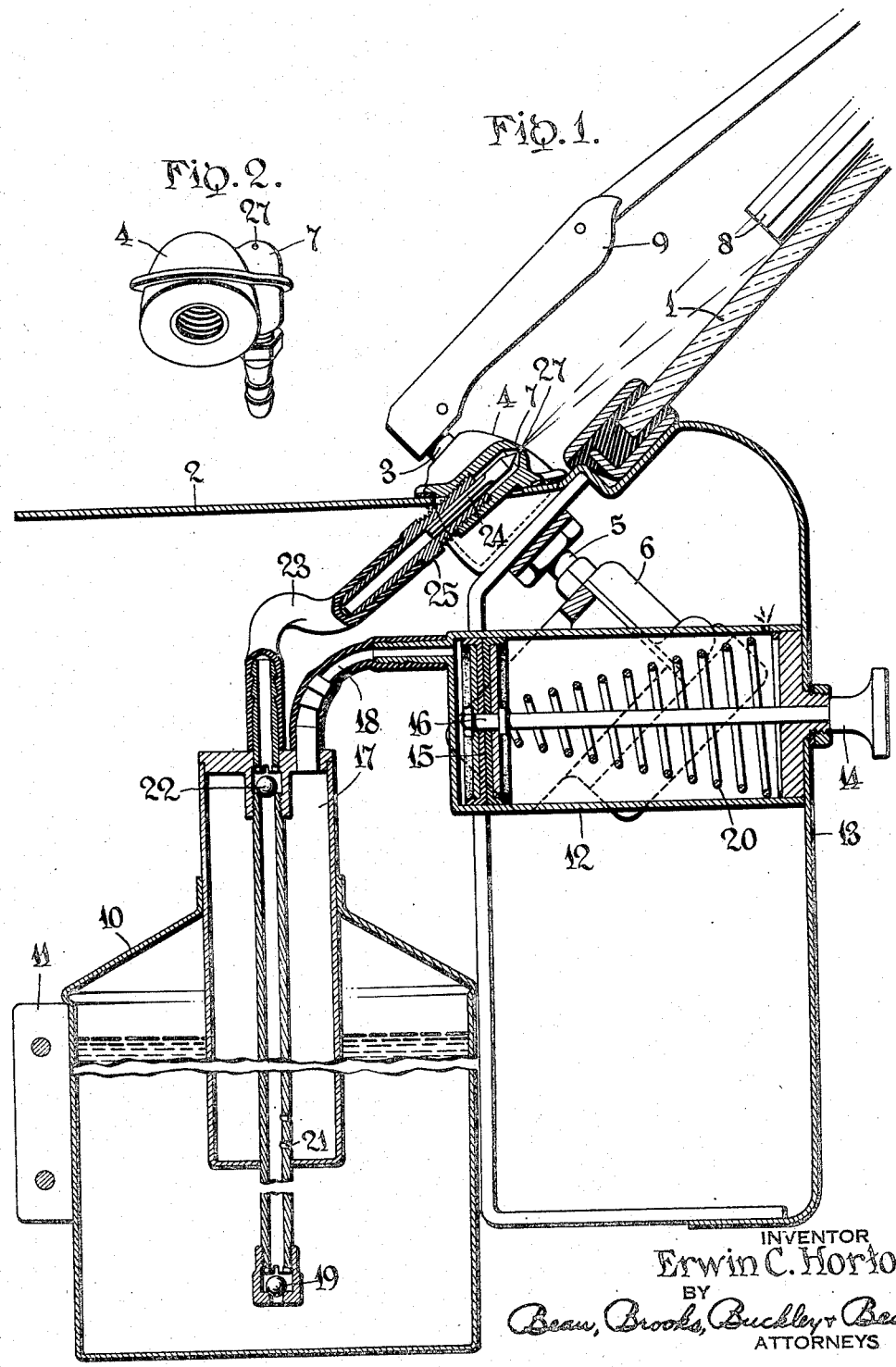

2,206,814

UNITED STATES PATENT OFFICE 2,206,814

WINDSHIELD CLEARING SYSTEM

Erwin C. Horton, Hamburg, N. Y., assignor to Trico Products Corporation, Buffalo, N. Y.

Application August 12, 1935, Serial No. 35,852

14 Claims. (Cl. 15—250)

This invention relates to a windshield clearing system for motor vehicles by which the field of vision for the motorist may be maintained clear under all driving conditions. Various spray devices have been designed for spraying cleaning liquids on the windshields of motor vehicles for removing ice and other obscuring matter therefrom. Such devices, however, have been unsatisfactory in use since the strong wind currents, developed by vehicular travel, tend to blow the spray or liquid away from the intended point of application. Especially is this true with the present day automobile which is designed for attaining high speeds during ordinary travel.

The present invention has for its object to provide a window clearing system in which a cleaning fluid or liquid is applied to the glass surface in a practical manner for obtaining better vision and greater conservation of the clearing liquid.

The invention further resides in the novel features of construction and the simplified arrangement of parts hereafter more fully described, reference being made to the accompanying drawings wherein Fig. 1 is a fragmentary sectional view through a portion of a motor vehicle equipped with a window clearing system constructed in accordance with the present invention;

Fig. 2 is a detailed view of the liquid applying nozzle;

Fig. 3 is a view similar to Fig. 1 of a further embodiment of the invention which is modified with the respect to the control;

Fig. 4 is a transverse section through the cleaner motor valve; and

Fig. 5 is a view depicting a further modified construction embodying the present invention.

Referring more particularly to the drawings, the numeral 1 designates the front window or windshield of a motor vehicle and 2 the forwardly extending cowl. The windshield wiper actuating shaft 3 is journaled in a housing 4 and extends therethrough for driving connection with the shaft 5 of a source of power, such as the windshield cleaner motor 6.

According to the present invention, means are provided to spray or shower the cleaning fluid on the window surface for a predetermined time interval sufficient to accomplish the desired clearing of the field of vision without waste of the fluid and in an automatic manner so that a minimum attention on the part of the motorist is required.

In the present disclosure the spray nozzle or jet 7 is located within the usual air pocket at the lower side of the windshield and disposed to eject the cleaning fluid with sufficient force to strike the glass in the path of the windshield wiper 8 where the wind currents are more intense. The wiper is carried by the arm 9 that is oscillated by the actuating shaft 3.

By disposing the jet at the lower side of the windshield and forwardly thereof, the stream of liquid is thereby disposed for being carried by the air stream upwardly onto the windshield surface. The jet is so disposed as to direct the liquid in the direction of air flow up the inclined windshield surface whereby an additional impetus is given the liquid by which it is forcibly applied to or driven against the window surface to more effectively loosen any vision obscuring matter which may have become lodged on the glass. The liquid serving as a solvent to reduce the non-liquid matter on the windshield to solution is, therefore, so applied as to provide a more or less mechanical action to loosen the foreign matter and facilitate the wiper's maintaining the field of vision clear for safe driving.

The cleaning fluid may be gaseous but preferably it is water or some liquid solution suitable for cleaning. For winter driving it is preferable to have a liquid which has a freezing temperature much lower than that of water, while for summer driving a concoction may be provided suitable to facilitate the removal of dust, insects and the like. It is preferred to have the spray of fluid impinge against the glass for practically the entire width of the wiper path and with sufficient force to counteract the tendencies of the air currents to glow the spray away from the window. The liquid jet or spray may originate at a point close to the axis of oscillation of the wiper and for this purpose the nozzle 7 may be formed as a part of the shaft supporting housing 4. This serves to simplify the installation of the wiper system and necessitates the formation of a single opening through the cowl. The longitudinal axis of the nozzle is shown extending through the housing body substantially at right angles to that of the shaft bearing.

The means for forcefully applying the liquid through the nozzle to the surface of the window may be set in operation alone or in conjunction with the windshield cleaner, but only for a substantially predetermined period of duration. This removes the control of the clearing liquid during its application from the motorist and thereby tends to conserve the liquid supply against waste as well as render uniform the several applications of the liquid, since the sprays or showers are substantially alike in duration and intensity.

According to Fig. 1, showing one embodiment of the invention, a liquid reservoir 10 is suitably mounted on a bracket 11 and a pump disposed in an accessible location, such as behind the instrument panel 13, for being brought into operation by a handle 14 that extends within reach of the motorist for ready operation. The pump may comprise a cylinder 12 and a fluid displacing member in the form of a movable wall or piston 15, the latter being connected to the control 14 by a rod 16. A chamber 17 is connected by a constantly open passage 18 to the cylinder of the pump and in effect becomes a part thereof, the same providing a clearance therefor whereby the piston is maintained free of the cleansing solution. This clearance chamber may be disposed adjacent the reservoir and is provided with a valve inlet 19 leading from the reservoir thereinto through openings 21 so that when the pump piston 15 is withdrawn against the urge of a compression spring 20 the liquid from the reservoir will flow into the clearance chamber, and then upon release of the setting or starting means in the form of the handle 14 the actuating means or spring 20 will urge the piston to subject the liquid in the clearance chamber to a pressure sufficient to force it outwardly through a valved outlet 22, a conduit 23 and the spray nozzle orifice 27. This ejection will take place over a time interval of limited duration and then will automatically terminate until the spray system is again set in operation. The spray device is thus actuated through its time interval by a motor, such as the spring 20, which may again be started at the will of the motorist.

In this connection it will be noted that the liquid is mechanically ejected substantially at a constant pressure as the spring motor 20 propels the pump piston 15 forwardly. The volume of the liquid is a predetermined one; it is delivered during a predetermined time interval and under a predetermined pressure, so that a uniformity in cleaning efficiency is accomplished without the manual effort of the motorist after once the spring actuated pump has been set in operation.

Consequently a single withdrawal of the piston 15 will take a predetermined charge of liquid from the reservoir into the clearance chamber 17 for subsequent discharge in jet form against the windshield after the motorist has released his hold upon the handle 14. The windshield wiper may be started in operation simultaneously with the operation of the liquid discharging device, as by means of a common control hereinafter described, and while the wiper is oscillating back and forth over the glass a continuous and forceful application of liquid is supplied in the path of the wiper for a predetermined interval of time. This insures a predetermined volume of the liquid being sprayed upon the glass during the operation of the wiper and this volume may be regulated by suitable means or by a more or less complete withdrawal of the piston. Furthermore, the time interval may be regulated by suitable means, such as by means of the jet valve 24 which may be regulated by applying a tool to the hexagonal grip 25 and turning the same in its threaded mounting.

In the embodiment illustrated in Fig. 3, the control of the spray device is combined with that of the cleaner motor 6 so that when the cleaner motor is started the spray device will likewise be set in operation. The cleaner motor, however, will continue its functioning after the spray interval has terminated and until it is manually shut off. Or, by adjustment, the cleaner may be automatically shut off simultaneously with the spray device, as will now be described.

The control 34 (Fig. 3) of the spray apparatus is withdrawn so as to have the piston 12 intake its charge of cleansing fluid. This control is interconnected with the control of the cleaner motor 6 so that when one is moved to an operative position the companion control will likewise be actuated. The interconnection between controls may be accomplished through a play movement, as by having the cleaner motor valve 35 slidably connected to the stem 36. This motor valve may be slidable on its seat 37 under the urge of a light spring 38 to close the suction supply port 39 from the motor port 40. (Where two motors are provided for operating plural wipers, another motor port 41 may be provided.) Each motor port will obviously be connected to its motor by a communicating passage, such as is indicated at 42.

The valve 35 is provided with a passage 43 by which it is adapted to connect the ports 39 and 40 when properly positioned and is movable to a closed position by the shoulder at the inner end of the control knob 34 under the urge of the stronger spring 20. The movement of the valve to its open position may be accomplished by the control in a permissive manner under the urge of the light spring 38, as in Fig. 3, or it may be positively accomplished, as shown in Fig. 5, wherein spaced shoulders 44 and 45 alternately engage the valve 46 as the stem 47 moves in and out.

When it is desired to operate the cleaner without bringing into actuation the spray device, the same may be performed by a control combined with the common control above recited, as by mounting the knob 34 for independent movement which permits its shoulder to be removed from a position that obstructs movement of the valve 35 by its light spring. For this purpose the knob may be threaded on the stem 36, as indicated at 48, and when it is unscrewed to the dotted line showing in Fig. 3, the motor valve will be permissively moved to a position for connecting the motor to the source of suction, or other operating power when other than suction is employed.

The feeding of the liquid to the jet is automatic and independent of manual control. Initiating the operation may be independent of or combined with that of the cleaner motor. The supply of liquid is conserved against wasteful discharge which might occur through inadvertence or thoughtlessness on the part of the motorist where the control is wholly manual. The volume of liquid to be applied is measured and determined and is applied under force throughout the initial portion of the wiper operation. The result is, in effect, an artificial shower of the liquid, limited in duration, under a definite pressure, and automatically terminated, all without dependency upon the human factor. This action serves to clear the window surface in the same uniform manner for each period of operation for better vision therethrough.

What is claimed is:

1. A housing for supporting the wiper shaft of a windshield cleaner at the front side of a windshield, said housing comprising a body having a wiper shaft journal bearing for the shaft, and a fixed spray nozzle, mountable and demountable as a unit.

2. A housing for supporting the wiper shaft of a windshield cleaner at the front side of a windshield, said housing comprising a unitary body having a wiper shaft journal bearing for the shaft, said body also having a fixed spray nozzle, the axis of the nozzle being disposed substantially at right angles to the axis of the shaft bearing.

3. A window clearing system comprising, in combination with the wiper, motor means for moving the wiper back and forth on the window surface, a nozzle for directing a jet of fluid on the window surface for loosening matter thrown in the path of the wiper, power means for delivering the fluid under pressure to the nozzle, and a control for selectively setting one of said means in operation independently of the other means or conjointly therewith.

4. A window clearing system comprising a wiper actuating motor, a control means for the motor, a nozzle directing a jet of cleaning fluid on the window surface to be cleaned, a motor for delivering the cleaning fluid under pressure to the nozzle, means for setting the second motor in operation, and a common control connecting said control means to said setting means for independent as well as conjoint use.

5. A window clearing system comprising, in combination with a wiper, a motor for moving the same back and forth on the window surface, and a control for the motor, motor means for spraying a fluid on the window surface for loosening matter thereon in the path of the wiper, a control for said spraying means interconnected with the first control for concurrent actuation therewith, and means permitting independent operation of said first control.

6. A window clearing system comprising, in combination with a wiper movable back and forth over the window surface, means for spraying a liquid in the path of the wiper, power means for supplying the spraying means with a measured quantity of the liquid under a substantially uniform pressure, and means operable by a moving part of said supplying means for controlling the actuation of said wiper.

7. A wiper shaft mounting unit comprising a housing having means for mounting the housing at the front side of the windshield of a motor vehicle, said housing comprising a body having a wiper shaft journal bearing, said housing also having a spray nozzle adjacent the journal bearing, and means carried by the housing for connecting the nozzle to a source of fluid supply, said housing with its journal bearing and spray nozzle being mountable and demountable as a unit.

8. A window clearing system for a motor vehicle, comprising jet means disposed adjacent the vehicle window for discharging a stream of liquid thereon, a reservoir for the liquid, a pump in communication with both the jet means and the reservoir and operable for displacing a substantially predetermined portion of the liquid content from the reservoir and delivering it under pressure to the jet means, and means operating the pump for a definite period to effect such liquid delivery onto the window and then automatically coming to rest to arrest such delivery.

9. In a motor vehicle construction having a windshield and an underlying body portion extending forwardly therefrom and provided with a nozzle receiving opening, a nozzle supported by the body portion in the opening thereof and directed upwardly for discharging a stream of liquid onto the windshield, a reservoir mounted beneath the body portion for containing a supply of the liquid, pump means connected for delivering a substantially predetermined volume of liquid from the reservoir to the nozzle, and one way means interposed in the fluid communication between the nozzle and the reservoir and automatically acting to hold the liquid in the upwardly directed nozzle against return to the reservoir when the pump means are inactive.

10. A window clearing system comprising a liquid reservoir, jet means communicating with the reservoir and disposed for spraying onto the window surface, pump means communicating with the reservoir and operable automatically to supply the jet means with liquid under pressure from the reservoir, said pump means embodying an element serving to maintain the pump means operative for a given time interval before coming to rest whereby to supply the jet means with a measured quantity of such liquid at a substantially uniform pressure, and means for setting said pump means in operation for such time interval.

11. A window clearing system comprising, in combination, a liquid reservoir, means for directing an application of liquid onto the window surface, a pump having its inlet connected to the reservoir and its outlet connected to such directing means, said pump being spring actuated on its expelling stroke for delivering the liquid to the window surface free of manual effort and for an interval limited in duration to the time which it takes for the spring to complete its stroke, and means for actuating the pump on its liquid intaking stroke to determine the extent of such interval of operation for the liquid expelling stroke.

12. A window clearing system for motor vehicles comprising a spray nozzle positioned for directing a stream of liquid onto the window, a reservoir for the liquid, and a pump having a spring actuated delivery stroke, said pump being operatively related to the reservoir and nozzle and operable for a predetermined time interval to deliver a measured quantity of liquid from the reservoir to the nozzle.

13. A windshield clearing system for motor vehicles of the stream line type having a rearwardly slanting windshield, comprising a wiper movable back and forth over the windshield surface, a jet disposed adjacent the forward lower side of the windshield for directing a jet of liquid solvent up onto the surface in the path of the wiper, whereby the liquid jet will be applied to the windshield surface in the direction of air currents passing upwardly over the windshield to be assisted by such air currents in its application to the windshield surface, and means for supplying the jet with liquid under pressure for such directional application by the assistance of the air currents.

14. A windshield clearing system for a motor vehicle having a slanting windshield with a cowl portion extending forwardly from the lower edge of the windshield, comprising a jet extending through an opening in the cowl portion and supported by the latter in a position for directing a jet of liquid upwardly on the windshield, and means for supplying liquid to the jet under pressure for such directional application.

ERWIN C. HORTON.

Disclaimer 2,206,814.—*Erwin C. Horton*, Hamburg, N. Y. WINDSHIELD CLEARING SYSTEM. Patent dated July 2, 1940. Disclaimer filed Apr. 11, 1950, by the assignee, *Trico Products Corporation.*

Hereby enters this disclaimer to claims 9, 13, and 14 in said specification.

[*Official Gazette May 9, 1950.*]